(12) United States Patent
Stoll

(10) Patent No.: US 6,363,833 B1
(45) Date of Patent: Apr. 2, 2002

(54) PISTON FOR HYDRAULIC POWER ASSIST RACK AND PINION STEERING SYSTEM

(75) Inventor: Richard A. Stoll, Royal Oak, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/641,277

(22) Filed: Aug. 17, 2000

(51) Int. Cl.⁷ .............................. F16J 1/00; F01B 9/00
(52) U.S. Cl. ........................................ 92/136; 92/172
(58) Field of Search ........................ 92/128, 136, 172, 92/255; 29/888.04, 888.051

(56) References Cited

U.S. PATENT DOCUMENTS

| | | | | |
|---|---|---|---|---|
| 4,123,965 A | * | 11/1978 | Brown et al. | 92/136 |
| 4,351,228 A | * | 9/1982 | Schultz et al. | 92/136 |
| 4,527,465 A | * | 7/1985 | Yoshida et al. | 92/136 |
| 4,646,868 A | | 3/1987 | Rosell | 92/98 D |

* cited by examiner

*Primary Examiner*—Edward K. Look
*Assistant Examiner*—Thomas E. Lazo

(74) *Attorney, Agent, or Firm*—Tarolli, Sundheim, Covell, Tummino & Szabo L.L.P.

(57) ABSTRACT

A hydraulic power assist steering system (10) for a vehicle having steerable wheels comprises a housing (14) and a rack (16). The system also comprises a fluid motor (20) for moving the rack (16). The fluid motor (20) includes a piston (10) fixedly connected to the rack (16) and a pump (36). The piston (10) has first and second opposite end faces (82, 84) against which hydraulic fluid is directed by the pump (36) to effect movement of the piston (10), and thereby the rack (16), relative to the housing (14). The piston (10) has a wall (60) including a first end portion (64) connected with the rack (16) at a first axial location along the rack, a second end portion (66) connected with the rack at a second axial location along the rack, and a central portion (62) extending between and interconnecting the first and second end portions of the wall. The central portion (62) of the wall (60) has an outer peripheral groove (70) for receiving a seal ring (86) for engagement with the housing (14). The first end portion (64) and the second end portion (66) and the central portion (62) of the piston (10) define a cavity (80) in the piston. The cavity (80) has an annular configuration extending around the rack (16) inside of the wall (60).

4 Claims, 2 Drawing Sheets

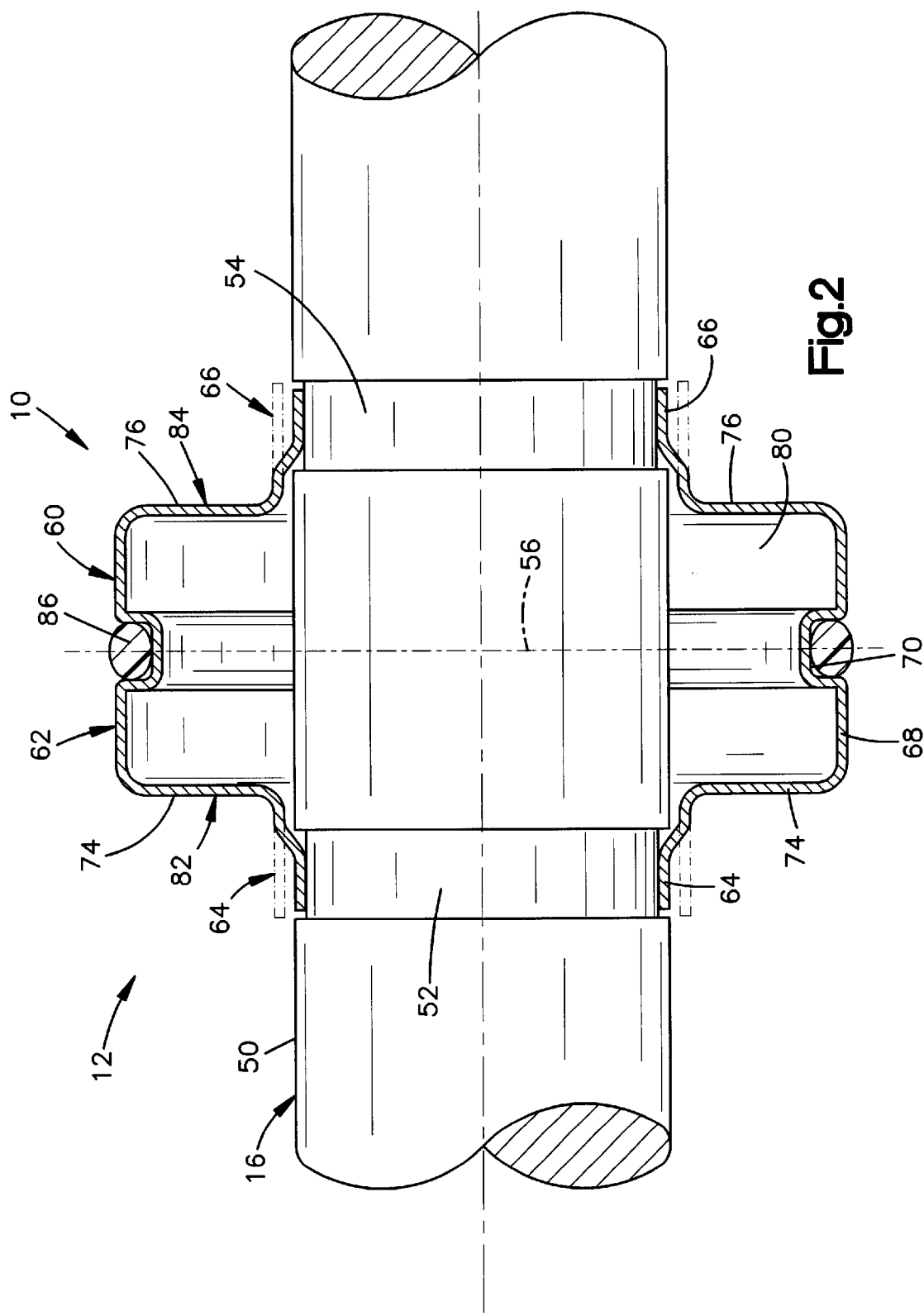

PISTON FOR HYDRAULIC POWER ASSIST RACK AND PINION STEERING SYSTEM

BACKGROUND OF THE INVENTION

1. Technical Field

The present invention relates to a piston for a hydraulic power assist rack and pinion steering system.

2. Description of the Prior Art

A known hydraulic power assist rack and pinion steering system for a vehicle comprises a rack movable to effect turning movement of the steerable wheels of the vehicle. A piston is mounted on the rack. A portion of the piston is received in one or more grooves in the rack to secure the piston to the rack. The piston forms part of a fluid motor for moving the rack in response to turning of the vehicle steering wheel.

The piston typically is formed by machining. In the machining process, a large amount of material is lost.

SUMMARY OF THE INVENTION

The present invention is a hydraulic power assist steering system for a vehicle having steerable wheels. The system comprises a housing and a rack movable in the housing to effect turning movement of the steerable wheels of the vehicle. The system also comprises a fluid motor for moving the rack. The fluid motor includes a piston fixedly connected to the rack and a pump. The piston has first and second opposite end faces against which hydraulic fluid is directed by the pump to effect movement of the piston, and thereby the rack, relative to the housing. The piston has a wall including a first end portion connected with the rack at a first axial location along the rack, a second end portion connected with the rack at a second axial location along the rack, and a central portion extending between and interconnecting the first and second end portions of the wall. The central portion of the wall has an outer peripheral groove for receiving a seal ring for engagement with the housing. The first end portion and the second end portion and the central portion of the piston define a cavity in the piston. The cavity has an annular configuration extending around the rack inside of the wall.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 2 is an enlarged view of a portion of FIG. 1 showing the piston.

DESCRIPTION OF AN EMBODIMENT OF THE INVENTION

Figure 1:
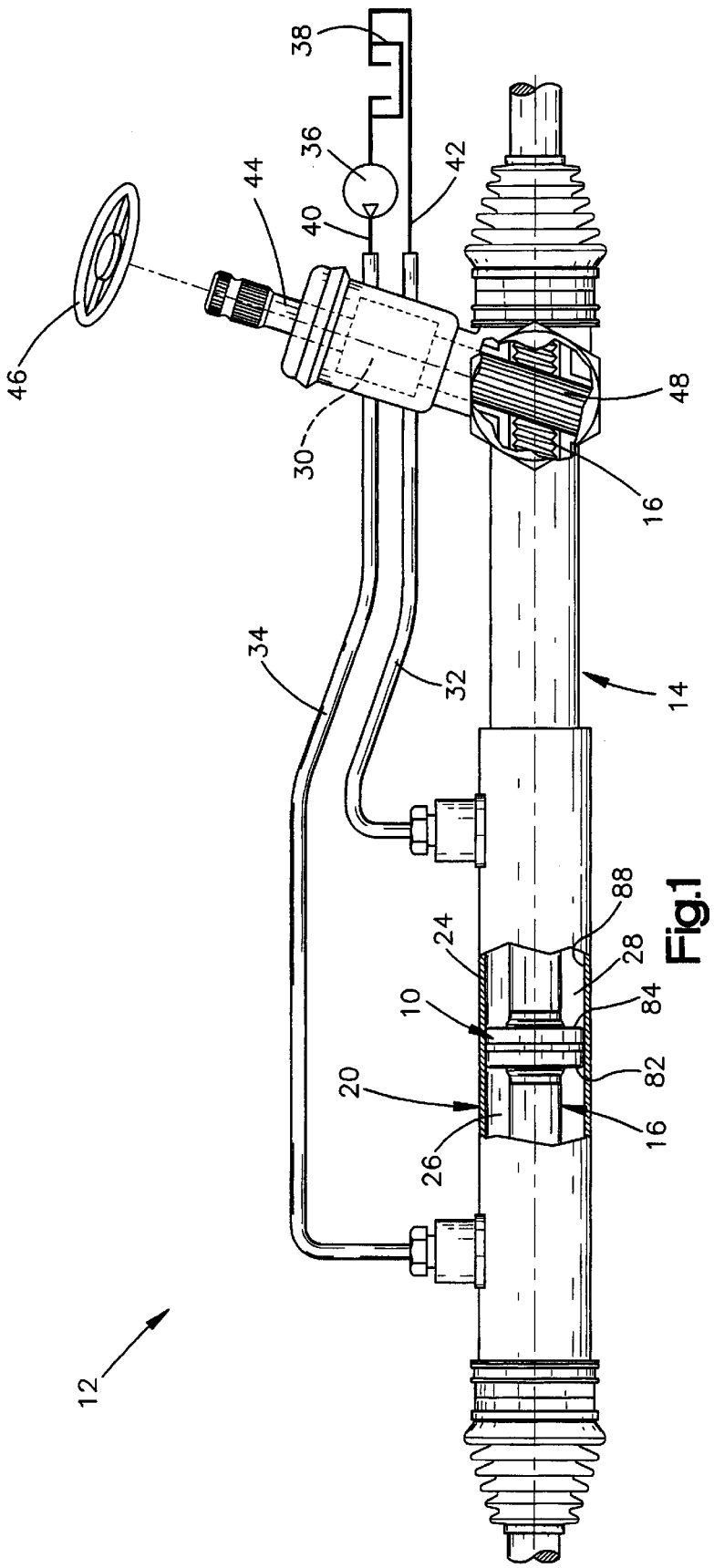
FIG. 1 is an elevational view, partly in section, of a hydraulic power assist rack and pinion steering system including a piston in accordance with the present invention.

The present invention relates to a piston for a hydraulic power assist rack and pinion steering system. The present invention is applicable to various piston designs for hydraulic power assist rack and pinion steering systems. As representative of the present invention, FIG. 1 illustrates a piston 10, which forms a part of a steering system 12.

The steering system 12 includes a housing 14. A steering member in the form of a rack 16 is supported by and is movable relative to the housing 14. Opposite ends of the rack 16 are connected by suitable linkage with steerable wheels (not shown) of the vehicle. Upon movement of the rack 16 relative to the housing 14, the steerable wheels of the vehicle are turned in a known manner.

The steering system 12 includes a hydraulic motor 20 for assisting the vehicle operator in turning the steerable wheels of the vehicle. The hydraulic motor 20 includes the piston 10, which is fixedly connected to the rack 16. The piston 10 is disposed in a cylinder 24 formed by the housing 14. The piston 10 divides the cylinder 24 into first and second fluid chambers or pressure chambers 26 and 28.

A control valve 30 is disposed in the housing 14. The control valve 30 is connected with the first and second chambers 26 and 28 of the motor 20 by a pair of conduits 32 and 34. The control valve 30 is also connected with a pump 36 and with a reservoir or sump 38, by another pair of conduits 40 and 42.

The steering system 12 further includes an input shaft 44. The input shaft 44 is connected for rotation with a steering wheel 46 of the vehicle. A torsion bar (not shown) in the control valve 30 connects the input shaft 44 with a pinion 48. The pinion 48 is in meshing engagement with the rack 16.

Upon rotation of the vehicle steering wheel 46, the torsion bar twists to enable the input shaft 44 to rotate relative to the pinion 48. Upon such relative rotation, the control valve 30 directs hydraulic fluid under pressure from the pump 36 to the motor 20. Operation of the hydraulic motor 20 moves the rack 16 and drives the pinion 48 to rotate in a follow-up manner. The control valve 30 returns to a neutral condition when the steerable wheels of the vehicle have been turned to an extent corresponding to rotation of the steering wheel 46 and the input shaft 44.

The rack 16 (FIG. 2) has a cylindrical outer surface 50. First and second grooves 52 and 54 are formed in the outer surface 50 of the rack 16. The first and second grooves 52 and 54 are spaced apart equally in opposite axial directions from a radially extending central plane 56 of the piston 10.

The piston 10 (FIG. 2) is formed as one piece from a suitable material, such as sheet metal. The piston 10 is formed by stamping, or drawing. Because the piston 10 is formed in this manner rather than by machining, a large amount of material is not lost during the process of forming the piston.

The piston 10 comprises a single wall 60 including a central portion 62 and first and second opposite end portions 64 and 66. The central portion 62 of the piston 10 has a generally disc-shaped configuration centered axially on the central plane 56. The central portion 62 includes a cylindrical, axially extending outer side wall portion 68 of the piston 10. An outer peripheral groove 70 is formed in the side wall portion 68.

The central portion 62 of the piston 10 also includes two annular, radially extending end wall portions 74 and 76. The end wall portion 74 extends between and interconnects the side wall portion 68 and the first end portion 64 of the piston 10. The end wall portion 76 extends between and interconnects the side wall portion 68 and the second end portion 66 of the piston 10.

The dashed lines in FIG. 2 illustrate the configuration of the piston end portions 64 and 66 when the piston 10 is formed and initially placed (by sliding) on the rack 16. The solid lines in FIG. 2 illustrate the configuration of the piston end portions 64 and 66 after the piston 10 is secured to the rack 16.

In assembly of the piston 10 to the rack 16, the first end portion 64 of the piston is deformed radially inward to engage in the first groove 52 in the rack. The second end portion 66 of the piston 10 is deformed radially inward to engage in the second groove 54 in the rack 16. The piston end portions 64 and 66 may be deformed by magnaforming or by swaging.

As a result, the piston 10 is secured in position on the rack 16. In this assembled condition, the first end portion 64 and the second end portion 66 and the central portion 62 of the piston 10 define a cavity 80 in the piston. The cavity 80 has an annular configuration extending around the rack 16 inside the wall 60.

When the piston 10 and the rack 16 are assembled in the housing 14, the piston is located between and partially defines the first and second pressure chambers 26 and 28 in the housing. The first end wall portion 74 of the central portion 62 of the piston 10 forms a first end face 82 of the piston. The first end face 82 of the piston 10 is exposed to pressurized fluid in the first pressure chamber 26.

The second end wall portion 76 of the central portion 62 of the piston 10 forms a second end face 84 of the piston. The second end face 84 of the piston 10 is exposed to pressurized fluid in the second pressure chamber 28. A seal ring 86 is received in the outer peripheral groove 70 of the piston 10. The seal 86 is in sealing engagement with a cylindrical inner surface 88 of the housing 14.

In operation of the steering system 12, hydraulic fluid is directed by the pump 36, in a known manner, against the first and second end faces 82 and 84 of the piston 10, to effect movement of the piston, and thereby the rack 16, relative to the housing 14. The seal 86 seals against the cylindrical inner surface 88 of the housing 14. The sealing engagement of the first and second end portions 64 and 66 of the piston 10, in the first and second grooves 52 and 54 of the rack 16, blocks fluid communication between the cavity 80 in the piston and the first and second pressure chambers 26 and 28. The cavity 80 in the piston 10 remains generally free of hydraulic fluid.

From the above description of the invention, those skilled in the art will perceive improvements, changes and modifications in the invention. Such improvements, changes and modifications within the skill of the art are intended to be covered by the appended claims.

Having described the invention, I claim:

1. A hydraulic power assist steering system for a vehicle having steerable wheels, said system comprising:

a housing and a rack movable in said housing to effect turning movement of the steerable wheels of the vehicle;

a fluid motor for moving said rack, said fluid motor including a piston fixedly connected to said rack and a pump;

said piston having first and second opposite end faces against which hydraulic fluid is directed by said pump to effect movement of said piston, and thereby said rack, relative to said housing;

said piston having a wall including a first end portion connected with said rack at a first axial location along said rack, a second end portion connected with said rack at a second axial location along said rack, and a central portion extending between and interconnecting said first and second end portions of said wall;

said central portion of said wall having an outer peripheral groove for receiving a seal ring for engagement with said housing;

said first end portion and said second end portion and said central portion of said piston defining a cavity in said piston;

said cavity having an annular configuration extending around said rack inside of said wall.

2. A steering system as set forth in claim 1 including first and second pressure chambers in said housing, said piston being located between said first and second pressure chambers, said first end face of said piston being exposed to pressurized fluid in said first pressure chamber and said second end face of said piston being exposed to pressurized fluid in said second pressure chamber, said cavity in said piston being blocked from fluid communication with said first and second pressure chambers.

3. A steering system as set forth in claim 2 wherein said piston is formed as one piece from a single piece of material.

4. A steering system as set forth in claim 1 wherein said rack has axially spaced first and second grooves receiving said first and second end portions of said piston.

* * * * *